US005296998A

United States Patent [19]

Jergenson et al.

[11] Patent Number: 5,296,998

[45] Date of Patent: Mar. 22, 1994

[54] LIGHTNING ARRESTER FOR UNDER-OIL APPLICATIONS

[75] Inventors: Ronny D. Jergenson, Hickory; Gary D. Davis, Taylorsville, both of N.C.

[73] Assignee: General Electric Company, Malvern, Pa.

[21] Appl. No.: 799,092

[22] Filed: Nov. 27, 1991

[51] Int. Cl.$^{5}$ ........ H02H 9/04

[52] U.S. Cl. ........ 361/117; 361/127

[58] Field of Search ........ 361/117, 118, 111, 119, 361/56, 91, 331, 332, 127; 174/140, 178

[56] References Cited

U.S. PATENT DOCUMENTS

| | | | |
|---|---|---|---|
| 2,915,674 | 12/1959 | Kalb et al. | 315/36 |
| 3,727,108 | 4/1973 | Westrom | 317/68 |
| 4,001,651 | 1/1977 | Kershaw | 361/117 |
| 4,240,124 | 12/1980 | Westrom | 361/127 |
| 4,282,557 | 8/1981 | Stetson | 361/117 |
| 4,899,248 | 2/1990 | Raudabaugh | 361/127 |

FOREIGN PATENT DOCUMENTS

| | | | |
|---|---|---|---|
| 1513484 | 12/1969 | Fed. Rep. of Germany | 361/117 |

*Primary Examiner*—A. D. Pellinen
*Assistant Examiner*—S. Jackson
*Attorney, Agent, or Firm*—Henry J. Policinski; William Freedman

[57] ABSTRACT

This lightning arrester includes (i) a tubular housing comprising a plurality of tubular sections disposed in telescoping aligned relationship to define an internal chamber and (ii) a stack of arrester elements located within this chamber. Locking means between adjacent telescoping sections holds the sections together in aligned relationship.

Each locking means between adjacent sections comprises radially-projecting lugs on a telescoping portion of one of the sections and generally L-shaped slots in a telescoping portion of the other of the sections. The lugs fit into the slots and are displaced into locking portions of the slots by twisting motion of one of the adjacent sections relative to the other.

In one embodiment, the housing sections are molded components of polymeric material and the lugs are also of polymeric material and are integral portions of the tubular housing on which the lugs are located.

13 Claims, 3 Drawing Sheets

LIGHTNING ARRESTER FOR UNDER-OIL APPLICATIONS

FIELD OF THE INVENTION

This invention relates to a lightning arrester for under-oil applications and, more particularly, relates to an arrester of this type which comprises a molded tubular housing of polymeric material and a stack of non-linear resistance ceramic discs located within the housing.

BACKGROUND

For different voltage ratings, arresters of this type employ stacks of ceramic discs having stack-lengths that are varied as a direct function of the rated voltage. Typically, this requires that housings of many different lengths be carried in the manufacturer's inventory in order to accommodate the different stack lengths. Substantial cost savings can be achieved if the number of different types of parts required for the housings of the many differently-rated arresters can be reduced.

One way of reducing the number of such parts is to fabricate the housings from pre-formed tubing that can be cut to the desired length and then suitably machined to accommodate end caps, supports, and any other supplemental components required. This approach is unduly labor-intensive and time-consuming, and our invention therefore seeks to avoid it.

Another concern of our invention is that if an arrester should fail during operation, relatively high pressures may be developed within the housing that could cause the housing to rupture. Should such a rupture occur, it is undesirable that live parts of the arrester be expelled from the arrester interior since this could make it more difficult to interrupt the circuit in which the arrester is connected and could cause additional damage to the involved apparatus. It is also undesirable that the ceramic discs be expelled from the housing in the event of a housing rupture.

OBJECTS

One object of our invention is to provide an arrester housing design that is able to utilize a relatively small number of different types of parts to accommodate many different stack lengths and, accordingly, many different arrester voltage ratings.

Another object is to provide a housing design that fulfills the immediately-preceding object and which utilizes simple parts that require no machining or cutting before they can be combined to form the desired housing.

Another object of our invention is to provide an arrester housing that comprises a relatively small number of parts that are held together by simple, easily-assembled locking means integral with the major components of the housing.

Another object is to achieve the immediately-preceding object with locking means that can be easily unlocked during the manufacturing process but which is highly-resistant to unlocking after completion of the manufacturing process.

Still another object of our invention is to provide an arrester housing design that when exposed to an arrester failure will rupture in a predetermined location and, especially, a location where there is a relatively low likelihood that live parts of the arrester and the ceramic discs will be expelled from the arrester interior.

SUMMARY

In carrying out the invention in one form, we provide a lightning arrester comprising a tubular housing comprising a tubular base section at one end of the housing, a tubular cap section at an opposite end of the housing, and a tubular spacer section between said base and cap sections, the sections being disposed in aligned relationship to define an internal chamber within the tubular housing. A stack of arrester elements is located within this internal chamber. First locking means holds the base section and the spacer section together in aligned relationship, and second locking means holds the spacer section and the cap section together in aligned relationship.

The tubular base and spacer sections are disposed in telescoping relationship when held together by the first locking means; and the first locking means comprises (i) generally radially-projecting lugs on a telescoping portion of one of the tubular base and spacer sections and (ii) generally L-shaped slots in a telescoping portion of the other of said tubular base and spacer sections. The lugs fit into the slots and are displaced into locking portions of the slots by twisting motion of one of the base and spacer sections relative to the other.

The tubular spacer and cap sections are disposed in telescoping relationship when held together by the second locking means; and the second locking means comprises (i) generally-radially projecting lugs on a telescoping portion of one of said tubular spacer and cap sections and (ii) generally L-shaped slots in a telescoping portion of the other of said tubular spacer and cap sections. These latter lugs fit into the latter slots and are displaced into locking portions of the latter slots by twisting motion of one of the spacer and cap sections relative to the other.

In one embodiment the housing sections are molded components of polymeric material and the lugs are also of polymeric material and are integral portions of the tubular housing sections on which the lugs are located.

In accordance with another aspect of the invention, one of the locking means is substantially weaker than the other in ability to resist separation of the tubular sections between which the respective locking means are located. Thus, housing-rupturing pressure within the internal chamber resulting from an arrester failure causes separation of a preselected pair of said housing sections while the other pair of said housing sections remains locked together.

DETAILED DESCRIPTION OF EMBODIMENT

Figure 3:
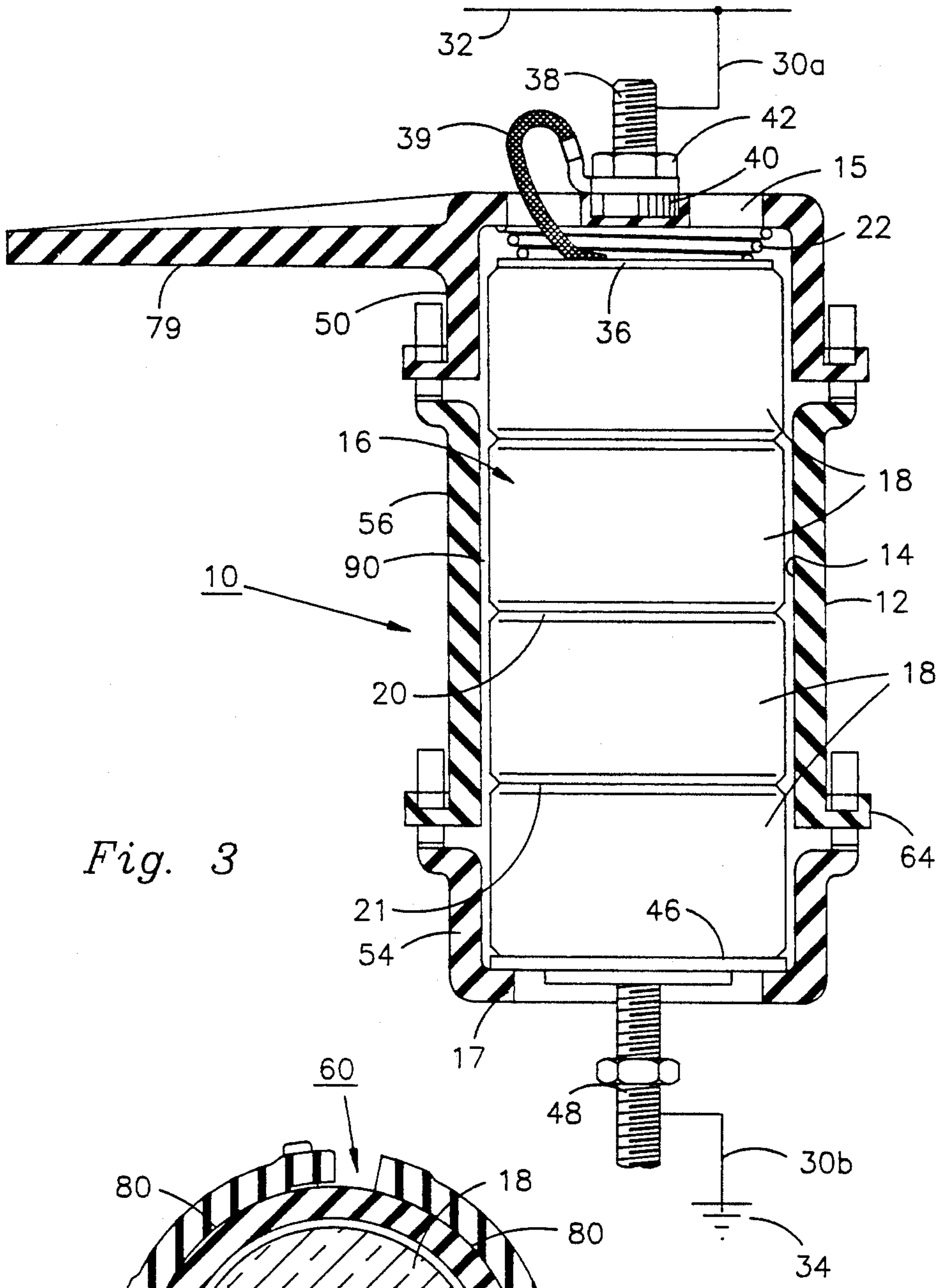
FIG. 3 is a sectional view along the line 3—3 of FIG. 2
Figure 4:
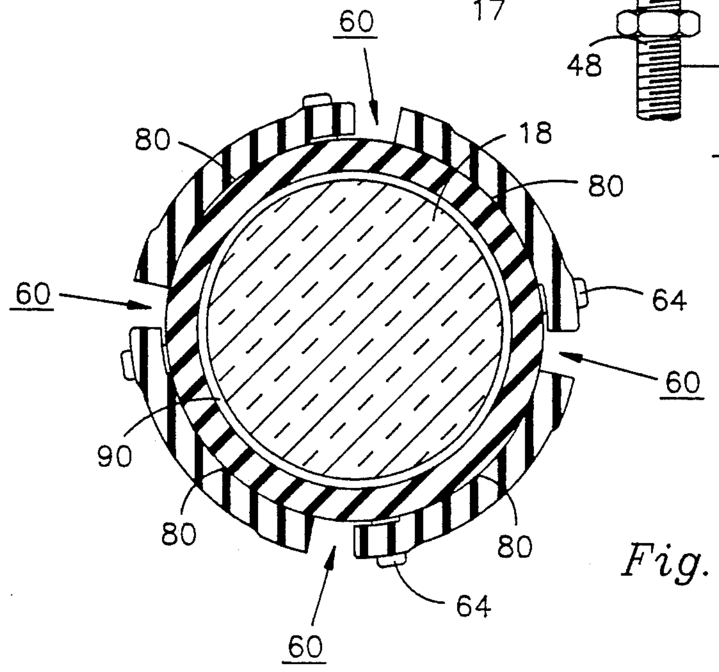
FIG. 4 is a sectional view along the line 4—4 of FIG. 1.

Referring now to FIGS. 1-5, there is shown a lightning arrester 10, especially adapted for under-oil applications, that comprises a housing 12 of polymeric electrical insulating material. Housing 12 is of an elongated tubular form and, as shown in FIG. 3, includes a cylindrical internal chamber 14, an upper end wall 15, and a lower end wall 17. Within the internal chamber 14 is a stack 16 of ceramic discs 18 of conventional non-linear resistance material, e.g., metal oxide varistor material. Each disc has its respective upper and lower surfaces coated with thin layers 20 and 21 of highly conductive metal bonded thereto. The coatings on adjacent discs are maintained in good electrical contact with each other by a compression spring 22 located at the top of the stack. This compression spring 22 is positioned between the top of the stack and the upper end wall 15 of the housing. Spring 22 forces the stack 18 downward against the lower end wall 17 and also forces the discs 18 together, thereby maintaining good electrical contact between the conductive coatings on adjacent discs.

Referring still to FIG. 3, the arrester has electrical terminals at its respective opposite ends for connecting the stack of discs 18 in a protective circuit 30*a*, 30*b* that extends between a high voltage line 32 and ground 34. The upper terminal comprises a metal contact plate 36 of circular disc form located between the compression spring 22 and the top of the stack 16, a conductive stud 38 molded into the upper end wall 15, and a flexible pigtail conductor 39 interconnecting contact plate 36 and stud 38. The stud 38 is a threaded member that comprises a hexagonal head 40 at its lower end that is imbedded in the material of the upper end wall 15. A nut 42 is threaded onto the stud 38; and between nut 42 and head 40 the upper terminal of the pigtail conductor 39 is clamped to provide good electrical contact with the stud. The lower terminal of the pigtail conductor is brazed or welded to the contact plate 36.

The lower terminal of the arrester comprises (i) a lower contact plate 46 located between the lowermost end of the stack 16 and the lower end wall 17 of housing 12 and (ii) a conductive stud 48 extending through the lower end wall and having its upper end brazed to the lower contact plate 46. This lower stud 48 is suitably connected through conductor 30*b* to ground.

Figure 1:
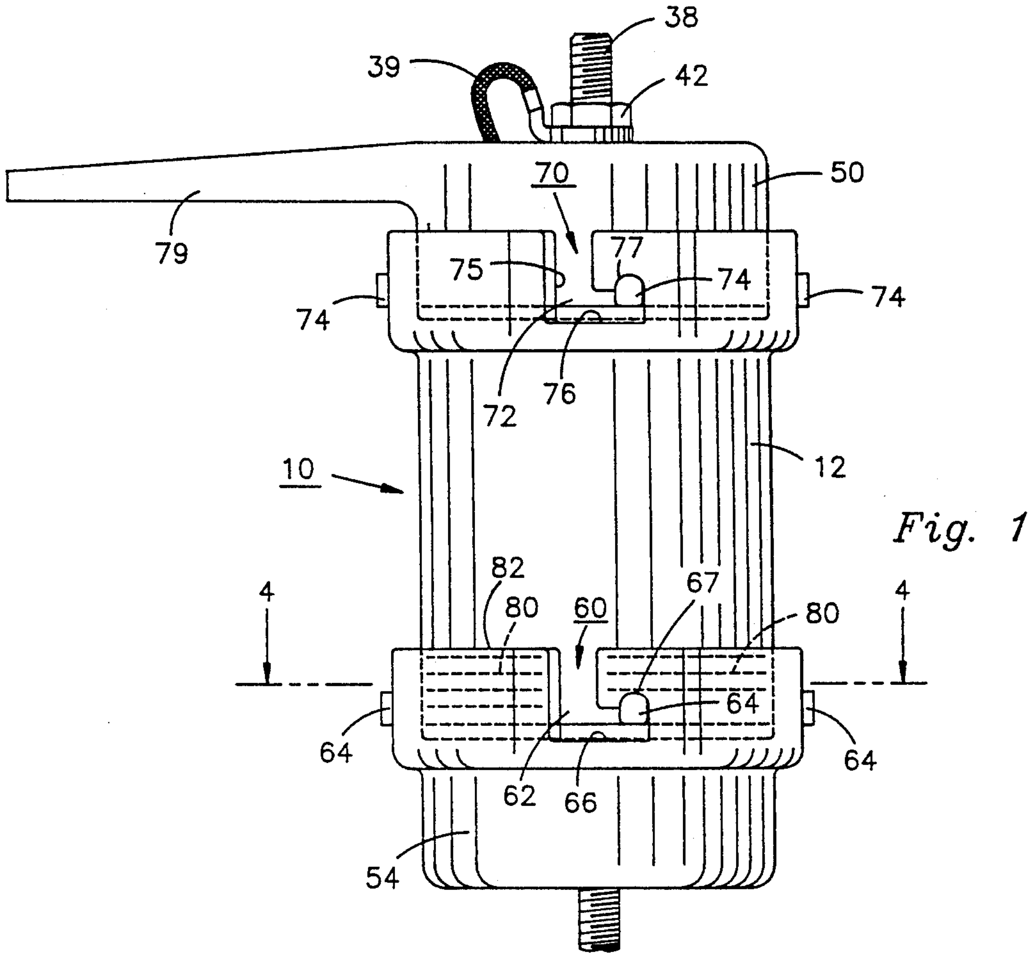
FIG. 1 is a side elevational view of an arrester embodying one form of our invention.
Figure 2:
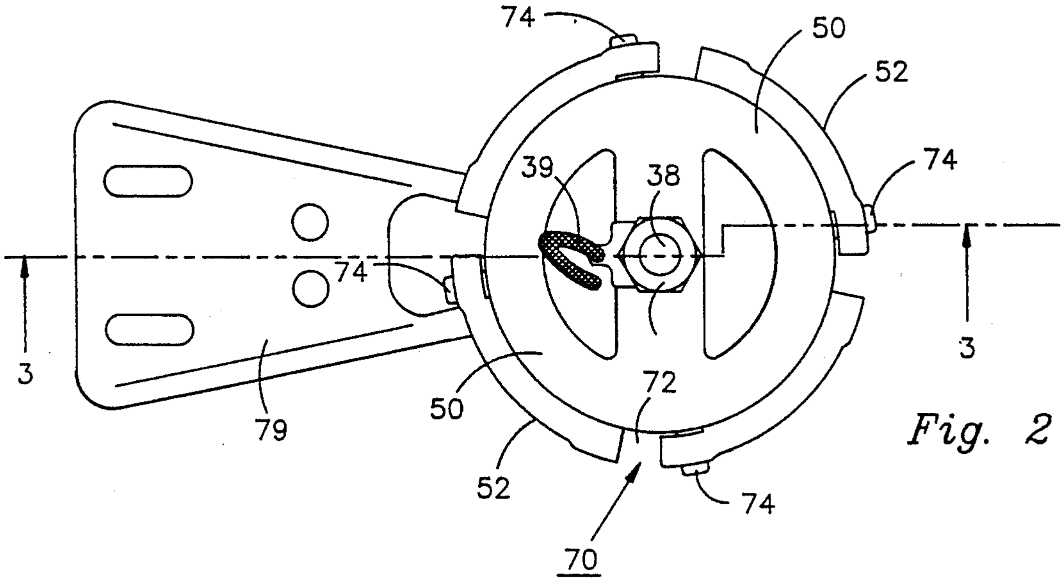
FIG. 2 is a top plan view of the arrester of FIG. 1.

The illustrated housing 12 comprises three basic parts: a tubular base section 50 located at the upper end of the housing, a tubular cap section 54 located at the lower end of the housing, and a tubular spacer section 56 located between the base section and the cap section. The cap section 54 has an enlarged upper end that telescopically receives the lower end of the spacer section 56, and the spacer section 56 has an enlarged upper end that telescopically receives the lower end of the base section 50. These housing sections are held together in substantially aligned relationship by bayonet-joint type locking means provided between adjacent sections. This locking means comprises, between each pair of adjacent-housing sections, four identical bayonet-joint type locks spaced apart equally about the periphery of the housing sections. One of these locks (60) is shown in FIG. 1 in its locking position and in FIG. 5 in an unassembled position that its parts would occupy when the housing sections 54 and 56 are ready for assembly. This lock 60 comprises a generally L-shaped slot 62 in the upper edge of the lower housing part 54 and a lug 64 integral with the adjacent housing part 56 near its lower edge. The L-shaped slot comprises an axially-extending portion 65 and a perpendicularly-extending portion 66 terminating at its right-hand end 68 in an enlarged locking portion 67. The lug 64 projects radially from the tubular portion of the adjacent housing part 56 and is adapted to fit into the L-shaped slot 62, as will soon be described.

Figure 5:
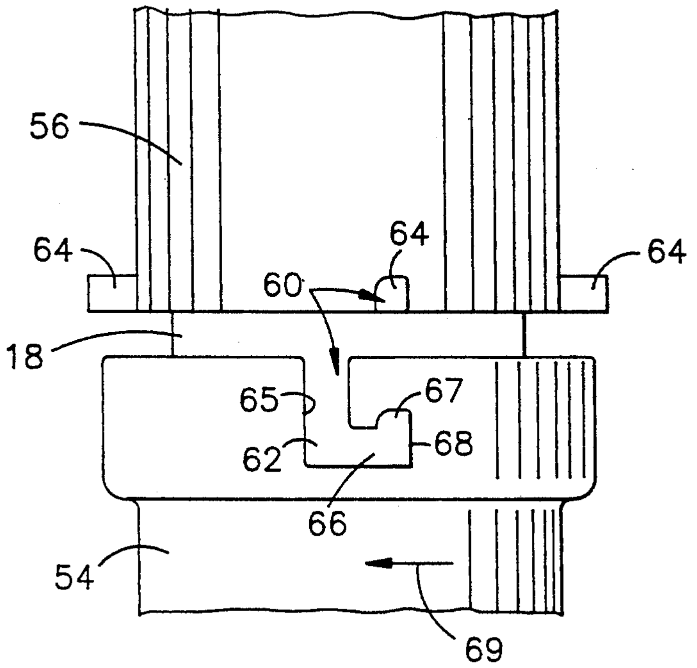
FIG. 5 is a side elevational view showing certain components of the arrester housing just prior to their being assembled together.

Referring to FIG. 5, the lock 60 is assembled by first placing the lower end of stack 16 of ceramic discs 18 within the tubular cap section 54 and then placing the tubular cap section 54 in alignment with the tubular spacer section 56 and in such a position that the illustrated lug 64 aligns with the axially-extending portion 65 of the L-shaped slot 62. Then the assembler lifts the cap section 54 axially, thereby compressing the spring 22 at the top of the stack 16 and also causing the lug 64 to enter the axially-extending portion 65 of slot 62. When lug 64 has reached the bottom of slot 62, the cap section 54 is twisted in the direction of arrow 69, causing the lug to enter the perpendicularly-extending portion 66 of the slot. When the lug reaches the right hand end 68 of the slot portion 66, the assembler releases the cap section 54, and the compressed spring 22 atop the stack 16 forces the cap section downwardly, causing the lug 54 to enter the enlarged locking portion 67 of the slot, thus positioning the parts in the locked position of FIG. 1. When the housing sections 54 and 56 are in this locked position of FIG. 1, they are blocked from moving angularly with respect to each other. Only by forcing the cap section 54 upwardly against the opposition of the spring 22 within the housing 12 (thereby displacing the locking portion 67 of the slot from lug 64) can the housing sections be unlocked to allow angular motion of the housing sections with respect to each other.

The four bayonet-joint type locks between housing sections 54 and 56 are identical so that they all act in unison and in the same manner as the above-described lock 60 during assembly, disassembly, and locking together of these two housing sections.

Between the middle and upper housing sections 56 and 50 there are four additional bayonet-joint type locks, each substantially identical to the above-described lock 60 of FIG. 1. One of these locks is designated 70 in FIG. 1, and its components are assigned the same last digit as corresponding components in the lock 60. This lock 70 is assembled, disassembled, and operates in substantially the same manner as described hereinabove for the lock 60 of FIG. 1. Preferably, the middle and upper housing sections 50 and 56 are assembled together before the stack 16 of ceramic discs is in place so that locking of the lug 74 in the locking portion 77 of L-shaped slot 75 is effected by gravity without assistance from spring 22. If desired, however, the housing sections 54 and 56 could be combined first, and then this subassembly, with the stack 26 present therein, could be combined with the upper housing section 50.

Figure 6:
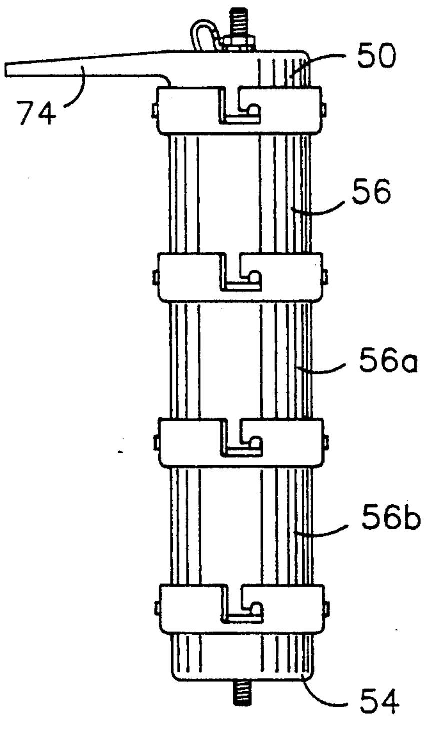
FIG. 6 is a simplified side elevational view of another embodiment of our invention.

While we have illustrated in FIGS. 1-5 an arrester comprising three housing sections (50, 56, and 54), it is to be understood that one or more additional housing sections identical to the middle housing section 56 can be added to this combination to produce housings for higher voltage arresters. Such additional sections can be introduced either between the illustrated housing sections 56 and 54 or between the illustrated housing sections 56 and 50. An example of such an arrester is shown in FIG. 6, where two additional housing sections 56*a* and 56*b*, each identical to section 56, are present between sections 56 and 54. Although not shown, the stack of ceramic discs within this longer housing would be correspondingly lengthened by introducing additional discs to accommodate the higher voltages. There are bayonet-joint type locks (corresponding to 60 and 70 of FIGS. 1-5) between the housing sections in the FIG. 6 embodiment, and some of these are shown in simplified form in FIG. 6.

Figure 7:
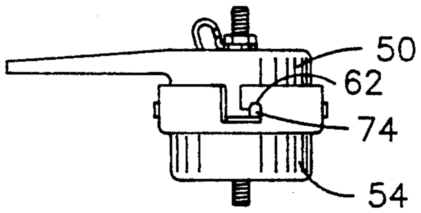
FIG. 7 is a simplified side elevational view of still another embodiment of our invention.

As shown in FIG. 7, a lower voltage arrester than that shown in FIGS. 1-5 can be made by omitting the middle housing section 56 and fastening the lower housing section 54 directly to the upper housing section 50. The lugs 74 on the upper housing section ar adapted to cooperate with the L-shaped slots 62 in the lower housing section 54 in the same manner as the lugs 64 (of FIGS. 1-5) cooperated with these slots 62. In the lowest voltage ratings, only two ceramic discs would be contained within this arrester housing.

In one commercial form of our invention, using the four different components described above, we have been able to build up housings of eight different voltage ratings ranging from 6 KV to 27 KV. At 6 KV we omit the middle section; at 9, 10, and 12 KV, We include one middle section; at 15 and 18 KV we include two middle sections at 21 KV we include three middle sections; and at 27 KV we include four middle sections.

As noted hereinabove, the arrester of FIGS. 1-5 is for under oil-applications. An example of such an application is inside a distribution transformer, where the arrester serves to protect the transformer from lightning surges and other overvoltages on the line 32. In a typical application of this type, the arrester is supported on stationary transformer structure, e.g., the usual transformer-core support (not shown) by means of a horizontally-extending bracket 79 integral with the base section 50 of the arrester housing. Bracket 79 is secured to the core support by screws (not shown) extending through holes 83 at the outer end of the bracket 79. Typically, the bracket 79 supports the arrester independently of the other housing sections 54, 56. The entire arrester is immersed in the transformer oil, which is free to enter the internal chamber 14 of the arrester through the various openings in the housing 12. The oil in the narrow cylindrical clearance space 90 between the arrester stack 16 and the internal surface of the housing provides dielectric strength, heat transfer assistance, and is adapted to act as a column through which any arc-generated pressures developed during an arrester failure can be transmitted to the end walls 15 and 17.

A significant feature of our invention is that all the housing sections are molded components made of a suitable polymer, and, particularly, molded components that require no machining or other fabricating operations before being combined to form the various housings described above. This simplifies and expedites the assembling of the overall arrester housing and improves reproducibility.

The means used for fastening the housing sections together, i.e., the bayonet-joint type locks, e.g., 60 and 70, are formed of components that are integral with the tubular portions of the housing sections, thus eliminating the need for additional fasteners and inventories of such fasteners. This further simplifies and reduces the cost of manufacturing the housing assembly and improves reproducibility.

As noted under "Background" hereinabove, if an arrester should fail during operation, relatively high pressures may be developed within the internal chamber 14 that could cause the housing to rupture. Should such a rupture occur, it is undesirable that live parts of the arrester be expelled from the internal chamber as a result of the rupture. It is also undesirable that the arrester discs 18 be expelled from the internal chamber as a result of the rupture.

To reduce the likelihood of either of these events, we construct the housing in such a manner that rupture of the housing in response to such pressures will consistently occur in a preselected location and, particularly, in a location where there is means effective to preclude expulsion of live parts and the arrester discs. In the embodiment of FIGS. 1-5, this preselected rupture location is situated between the base section 50 and the spacer section 56. Although the bayonet-joint type locks 70 between tubular sections 50 and 56 are substantially identical to those 60 present between sections 56 and 54, the junction between sections 50 and 56 (i.e., the upper junction) will fail before the junction between sections 56 and 54 (i.e., the lower junction). This is the case because we apply a strong adhesive between the telescoping portions of the lower junction. More specifically, we apply an epoxy adhesive in the regions designated 80 in FIGS. 1 and 4 that are located angularly between the locks 60. Preferably the adhesive is applied at the top edge 82 of the cap section and allowed to run down into the small clearance space where the two sections overlap, or telescope When the adhesive dries and cures, the lower junction is much stronger than the upper junction. No adhesive comparable to the adhesive applied in regions 80 is applied to the upper junction, though in some cases a drop of adhesive may be applied to each lug 74 to discourage tampering with this upper junction in the final arrester.

There are several reasons why the upper junction is the preferred location for a housing rupture. Before discussing these reasons, it is noted that the pressures that produce a housing rupture typically result from an electric arc vaporizing oil within the internal chamber 14; and these pressures are applied through the oil column 90 to the ends of the housing, thus producing a tensile force on the housing. This tensile force, if high enough to rupture the housing, causes the upper lugs 74 to shear and drives the lower two housing sections 56 and 54 downwardly as a unit away from the stationary upper housing section 50. The arrester elements in the stack 16 are retained within the lower two housing sections, in part, because the compression spring 22 at the top of the stack discharges in response to rupture of the housing and thus initially drives the stack downwardly with the downwardly-moving lower housing sections 56 and 54. The fact that the spacer section 56 has an upper end region that overlaps the upper housing section imparts additional length to this spacer section to assist during this interval in retaining the arrester elements 18 within the spacer section. Also the fact that the upper arrester element 18 extends downwardly past the lower end of the upper housing section 50 and into the spacer section 56 reduces the likelihood that this upper arrester element will escape from the tubular spacer section when the spacer section moves downward.

It will be apparent that the upper contact plate 36, being permanently connected to stud 38 through pigtail 39, remains at line potential even when a housing rupture occurs at the upper junction. To prevent this live contact plate 36 from being ejected from the housing in the event of such a housing-rupture, the pigtail 39 is made sufficiently short to limit downward travel of the contact plate to a position near the lower end of the base section 50 of the housing. When the spring 22 discharges in response to housing-rupture, it drives the contact plate downwardly until the pigtail becomes taut. In a preferred embodiment, the contact plate at this instant is still within the base section 50. This prevents the live contact plate from coming into contact, or close proximity, with adjacent apparatus and thereby further involving the apparatus in the fault condition.

Another feature of the illustrated arrester is that the tubular sections of the housing 12 can be easily disassembled during the manufacturing process to allow replacement of one or more ceramic discs 18 should an IR or other test show that any such disc is deficient. Such disassembly can be effected by forcing the housing sections 54 and 56 together to displace the lugs 64 from their locking position and then twisting tubular section 54 in a direction opposite to the arrow 69 (of FIG. 5) to align the lugs with the axial sections 65 of the L-shaped slots 62. The tubular housing sections 54 and 56 are then unlocked from each other and will be separated by spring 22. When the appropriate ceramic disc or discs are thereafter replaced, the cap section 54 is again joined to the spacer section 56. The arrester can then be retested and should it be satisfactory, the above-described adhesive at 80 is introduced, thus essentially preventing another unlocking of the lock 60.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A lightning arrester for use under oil, comprising:

(a) a generally vertically-extending tubular housing having upper and lower ends and comprising a tubular base section at said upper end, a tubular cap section at said lower end, and a tubular spacer section between said base and cap sections, said sections being disposed in substantially aligned relationship to define a generally vertically-extending internal chamber within said tubular housing, (b) means for securing said base section to stationary structure independently of said spacer and cap sections, (c) a stack of arrester elements and contacts at opposite ends of said stack located within said internal chamber, one of said contacts being a line contact having a normal location within said tubular base section, (d) first locking means for holding said base section and said spacer section together in substantially aligned relationship, (e) second locking means for holding said spacer section and said cap section together in substantially aligned relationship, and in which:

(f) said first locking means is substantially weaker than said second locking means in ability to resist separation of the tubular sections between which the respective locking means are located, whereby housing-rupturing pressure within said internal chamber resulting from an arrester failure causes separation of said spacer section from said base section while said spacer section remains locked to said cap section, and (g) motion-limiting means is provided for holding said line contact within or immediately adjacent said tubular base section in the event of separation of said spacer section from said base section in response to a buildup of housing-rupturing pressure within said internal chamber.

2. An arrester as defined in claim 1 and in which:

(a) spring means is provided within said tubular base section and above said line contact for biasing the line contact into engagement with the top of said stack of arrester elements, (b) said spring means discharges upon separation of said spacer section from said base section, and (c) said motion-limiting means limits the travel of said line contact when said spring means discharges upon separation of said spacer section from said base section.

3. The arrest of claim 2 in which:

(a) said tubular spacer section and said tubular base section are disposed in telescoping relationship when held together by said first locking means, (b) the top arrester element of said stack is located partially in said tubular base section and partially in said spacer section when said base section and said spacer section are held together by said first locking means, and (c) said top arrester element is contained within said tubular spacer section upon separation of said spacer section from said base section.

4. The lightning arrester of claim I in which:

(a) said tubular spacer section and said tubular base section are disposed in telescoping relationship when held together by said first locking means, and (b) all of the arrester elements are contained within the portion of said tubular housing constituted by said spacer section and said cap section when said spacer section separates from said base section in response to a build-up of housing-rupturing pressure within said internal chamber.

5. The lightning arrester of claim 4 in which:

(a) said tubular base section and said tubular cap section are disposed in telescoping relationship when held together by said second locking means, and (b) said first and second locking means are substantially identical so that said cap section is interlockable with said base section if said spacer section is omitted.

6. The lightning arrester of claim 1 in which:

(a) each of said locking means comprises locking elements on the associated two tubular sections that interlock when the locking means is effective, and (b) the locking elements on the upper tubular sections at the respective junctions between sections are identical and the locking elements on the lower tubular sections at the respective junctions between sections are substantially identical, whereby the locking elements on the lower section of each junction are adapted to interlock with the locking elements on the upper section of each junction when any of the upper and lower sections are placed in proximity to each other.

7. A lighting arrester comprising:

(a) a tubular housing comprising a tubular base section at one end of said housing, a tubular cap section at an opposite end of said housing, and a tubular spacer section between said base and cap sections, said sections being disposed in substantially aligned relationship to define an internal chamber within said tubular housing, (b) a stack of arrester elements located within said internal chamber, (c) first locking means for holding said base section and said spacer section together in substantially aligned relationship, (d) second locking means for holding said spacer section and said cap section together in substantially aligned relationship, and in which:

(e) said tubular spacer section and said tubular base section are disposed in telescoping relationship when held together by said first locking means, said first locking means comprises (i) generally radially- projecting lugs on a telescoping portion of one of said tubular base and spacer sections and (ii) generally L-shaped slots in a telescoping portion of the other of said tubular base and spacer sections, said lugs fit into said slots and are displaced into locking portions of said slots by twisting motion of one of said base and spacer sections relative to the other, and (f) said tubular spacer section and said tubular cap section are disposed in telescoping relationship when held together by said second locking means, said second locking means comprises (i) generally radially-projecting lugs on a telescoping portion of one of said tubular spacer and cap sections and (ii) generally L-shaped slots in a telescoping portion of the other of said tubular spacer and cap sections, said latter lugs fit Into said latter slots and are displaced into locking portions of said latter slots by twisting motion of one of said spacer and cap sections relative to the other.

8. The lightning arrester of claim 7 in which said housing sections are molded components of polymeric material and said lugs are also of polymeric material and are integral portions of the tubular housing sections on which said lugs are located.

9. The lightning arrester of claim 7 in which one of said locking means is substantially weaker than the other of said locking means in ability to resist separation of the tubular sections between which the respective locking means are located, whereby housing-rupturing pressure within said internal chamber resulting from an arrester failure causes separation of a preselected pair of said housing sections while the other pair of said housing sections remain locked together.

10. The arrester of claim 9 in which:

(a) one of said housing sections is held stationary when said preselected pair of housing sections separate in response to the build-up of housing-rupturing within said internal chamber, (b) a line contact is disposed at one end of said stack within said housing section that remains stationary, and (c) means is provided for holding said line contact within or immediately adjacent said housing section that remains stationary in the event of separation of said preselected pair of housing sections in response to build-up of housing-rupturing pressure within said internal chamber.

11. The arrester of claim 7 in which:

(a) said cap section is dimensioned to fit in telescoping relationship with said base section if said spacer section is omitted, and (b) the lugs and slots of said first locking means are substantially identical with the respective lugs and slots of said second locking means, whereby the slots of said second locking means are capable of interlocking with the lugs of said first locking means if said spacer section is omitted and said cap section is disposed in telescoping relationship with said base section.

12. A lightning arrester comprising:

(a) a tubular housing comprising a tubular base section at one end of said housing and a tubular cap section at an opposite end of said housing, said housing sections being disposed in substantially aligned relationship to define an internal chamber within said tubular housing, (b) an arrester element assembly located within said internal chamber, (c) locking means for holding said base section and said cap section together in telescoping substantially aligned relationship, said locking means comprising (i) generally radially-projecting lugs on a telescoping portion of one of said housing sections and (ii) generally L-shaped slots in a telescoping portion of the other of said housing sections, said lugs fitting into said slots and being displaced into locking portions of said slots by twisting motion of one of said tubular housing sections with respect to the other.

13. The lightning arrester of claim 12 in which said housing sections are molded components of polymeric material and said lugs are also of polymeric material and are integral portions of the tubular housing section on which said lugs are located.

* * * * *

UNITED STATES PATENT AND TRADEMARK OFFICE
CERTIFICATE OF CORRECTION

PATENT NO. : 5,296,998

DATED : March 22, 1994

INVENTOR(S) : R.D. Jergenson and G.D. Davis

It is certified that error appears in the above-identified patent and that said Letters Patent is hereby corrected as shown below:

Column 5, line 23, change "We" to -- we --

Column 5, line 25, after "sections" (first occurrence) insert a semicolon (;)

Column 9, line 33, change "Into" to -- into --

In Fig. 6 of the drawings, change "74" to -- 79 --

Signed and Sealed this

Second Day of August, 1994

Attest:

BRUCE LEHMAN

*Attesting Officer*

*Commissioner of Patents and Trademarks*